United States Patent
Takla

(10) Patent No.: US 11,595,802 B2
(45) Date of Patent: Feb. 28, 2023

(54) SYSTEMS AND METHODS FOR CONTROLLING VEHICLE-TO-EVERYTHING PERSONAL SAFETY MESSAGE TRANSMISSION

(71) Applicant: Verizon Patent and Licensing Inc., Basking Ridge, NJ (US)

(72) Inventor: Mourad B. Takla, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/302,244

(22) Filed: Apr. 28, 2021

(65) Prior Publication Data

US 2021/0250748 A1  Aug. 12, 2021

Related U.S. Application Data

(63) Continuation of application No. 16/694,803, filed on Nov. 25, 2019, now Pat. No. 11,006,264.

(51) Int. Cl.
| | |
|---|---|
| *H04W 4/00* | (2018.01) |
| *H04W 4/90* | (2018.01) |
| *H04W 4/029* | (2018.01) |
| *H04W 28/22* | (2009.01) |
| *H04W 4/40* | (2018.01) |

(52) U.S. Cl.
CPC ............ *H04W 4/90* (2018.02); *H04W 4/029* (2018.02); *H04W 4/40* (2018.02); *H04W 28/22* (2013.01)

(58) Field of Classification Search
CPC ......... H04W 4/90; H04W 4/029; H04W 4/40; H04W 28/22
See application file for complete search history.

(56) References Cited

U.S. PATENT DOCUMENTS

| | | | |
|---|---|---|---|
| 9,896,030 B2 * | 2/2018 | Sugimoto | ............... G08G 1/166 |
| 11,006,264 B1 * | 5/2021 | Takla | ................. H04W 28/22 |
| 2010/0019932 A1 | 1/2010 | Goodwin | |
| 2010/0173603 A1 | 7/2010 | Kwak et al. | |
| 2010/0279647 A1 | 11/2010 | Jacobs et al. | |
| 2015/0170522 A1 | 6/2015 | Noh | |
| 2017/0069207 A1 | 3/2017 | Ma | |
| 2018/0342154 A1 * | 11/2018 | Lee | ................. G08G 1/166 |
| 2019/0004179 A1 | 1/2019 | Hwang et al. | |
| 2019/0364402 A1 | 11/2019 | Lee | |
| 2020/0021355 A1 | 1/2020 | Pinheiro et al. | |
| 2020/0137536 A1 | 4/2020 | Nguyen et al. | |

* cited by examiner

*Primary Examiner* — Erika A Washington

(57) ABSTRACT

A device may receive, from a user device, a vehicle-to-everything (V2X) personal safety message (PSM) that includes an indication of a location of the user device. The device may determine a relaying action to be performed by the device with respect to the PSM based on the location of the user device, wherein the relaying action includes at least one of: relaying the PSM to one or more V2X devices in a vicinity of the device, refraining from relaying the PSM to the one or more V2X devices, or transmitting an aggregate PSM that is generated based on multiple PSMs, including the PSM, received from multiple user devices. The device may perform the determined relaying action.

20 Claims, 10 Drawing Sheets

SYSTEMS AND METHODS FOR CONTROLLING VEHICLE-TO-EVERYTHING PERSONAL SAFETY MESSAGE TRANSMISSION

RELATED APPLICATION

This application is a continuation of U.S. patent application Ser. No. 16/694,803, entitled "SYSTEMS AND METHODS FOR CONTROLLING VEHICLE-TO-EVERYTHING PERSONAL SAFETY MESSAGE TRANSMISSION," filed Nov. 25, 2019 (now U.S. Pat. No. 11,006,264), which is incorporated herein by reference in its entirety.

BACKGROUND

Vehicle-to-everything (V2X) communication may refer to communications between a vehicle and an entity to convey information that may affect the vehicle. Cellular V2X refers to V2X communications that follow Third Generation Partnership Project (3GPP) specifications, such as Long Term Evolution (LTE) specifications or New Radio (NR) specifications.

DETAILED DESCRIPTION OF PREFERRED EMBODIMENTS

The following detailed description of example implementations refers to the accompanying drawings. The same reference numbers in different drawings may identify the same or similar elements.

In a vehicle-to-everything (V2X) communication system, user devices of vulnerable road users (VRUs), such as pedestrians or cyclists, may transmit personal safety messages (PSMs) to other devices in the V2X communication system (e.g., user equipment associated with a vehicle or infrastructure). A PSM may include information that assists with avoiding collisions of vehicles with VRUs, such as information that indicates a location of a user device of a VRU. When a V2X device (e.g., a user equipment) of a vehicle receives a PSM, the V2X device may avoid the location indicated in the PSM to avoid a collision. However, transmission of PSMs present several challenges.

As an example, frequent transmission of PSMs by a user device may drain a battery of the user device and may consume network resources (e.g., time or frequency domain resources). For example, a user device may be expected to transmit a PSM directly to other V2X devices every 100 milliseconds. In some cases, frequent transmission of PSMs may be needed to improve the safety of a VRU. In other cases, frequent transmission of PSMs may be unnecessary and lead to wasted battery power, excessive messaging, excessive backhaul, wasted processing, and other wasted network resources. Some systems and methods described herein enable PSM transmissions to be dynamically adjusted to improve VRU safety while also conserving user resources (e.g., processing power, memory, battery power, and/or the like), and reducing network congestion.

As another example, reception of a large number of PSMs by a V2X device (e.g., of a vehicle) may overwhelm reception and processing resources of the V2X device and/or may require significant reception and processing resources for proper handling by the V2X device. This may lead to consumption of a large amount of resources of the V2X device and the network, such as processing resources, memory resources, battery power, and/or the like. Some systems and methods described herein enable filtering and aggregation of PSMs to reduce a load on V2X device resources.

Figure 1A:
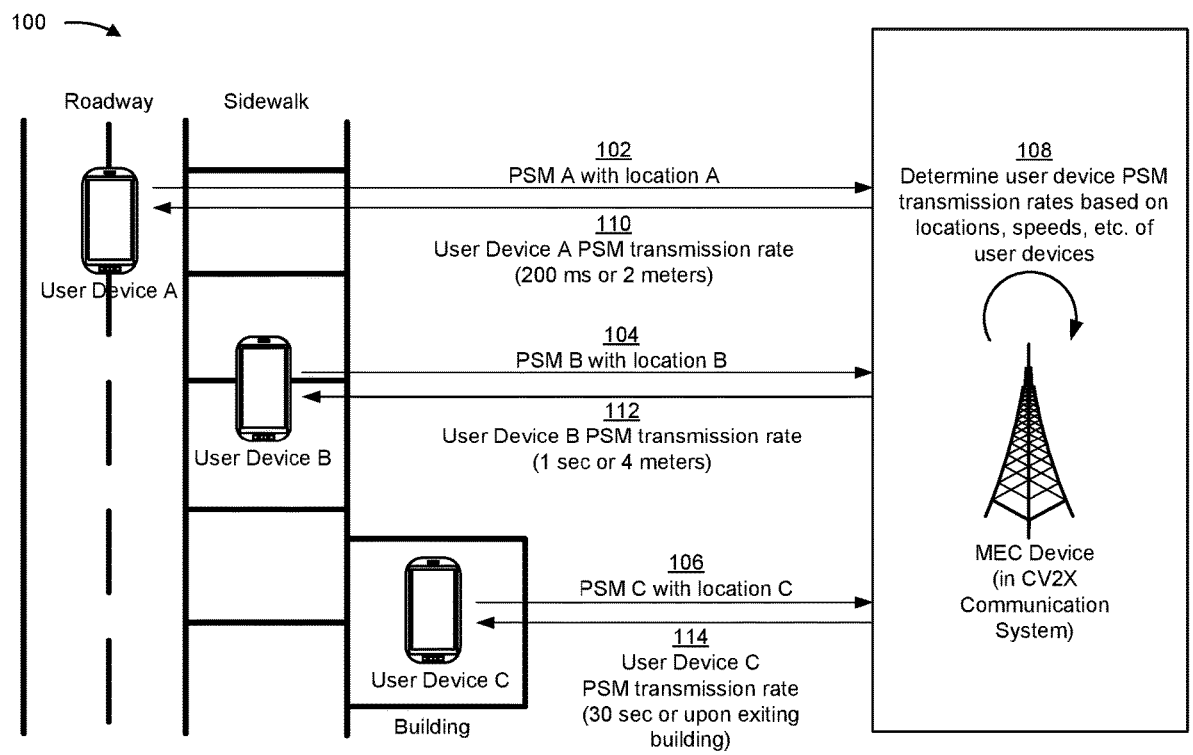
FIGS. 1A-1E are diagrams of one or more example implementations described herein.

FIGS. 1A-1E are diagrams of an example implementation 100 described herein. As shown in FIG. 1A, multiple user devices may communicate with a device, such as a multi-access edge computing (MEC) device in a cellular V2X (CV2X) communication system, among other examples. FIGS. 1A-1E show User Device A, User Device B, and User Device C as an example. A user device may transmit a PSM to the MEC device via an uplink communication, and may receive information from the MEC via a downlink communication. For example, a user device and the MEC may establish a connection, such as a radio resource control (RRC) connection, and may exchange uplink and downlink communications based on a configuration indicated as part of establishing the RRC connection. Additionally, or alternatively, the user device may register and/or authenticate with the MEC device, may be assigned to the MEC device (e.g., by a core network device), may indicate user device capabilities to the MEC device (e.g., a capability to support a variable PSM transmission rate), and/or may communicate with the MEC device using licensed spectrum. In example implementation 100, the user devices communicate with other user devices (e.g., V2X devices) via the MEC device (e.g., using licensed spectrum), and do not communicate directly with one another (e.g., do not use device-to-device (D2D) communication, peer-to-peer (P2P) communications, sidelink communications, communications on a 5.9 gigahertz sidelink channel, and/or the like). In this way, the MEC can control transmission of PSMs in the V2X communication system. A PSM is sometimes referred to as a V2X PSM.

As shown by reference number 102, User Device A may transmit a first PSM, shown as PSM A, to the MEC device. PSM A may indicate a location of User Device A, such as using global positioning system (GPS) coordinates, triangulation information, transmit power information, real time kinematics, and/or the like. Additionally, or alternatively, PSM A may indicate a speed of User Device A, a direction of movement of User Device A, a velocity of User Device A, a predicted trajectory of User Device A, a transmission rate of PSMs associated with User Device A (as described in more detail elsewhere herein), or other personal safety information that can be used to avoid collisions and/or to predict a user's intent. As shown, User Device A may be located in a roadway (e.g., within opposite boundaries or edges of the roadway).

As shown by reference number 104, User Device B may transmit a second PSM, shown as PSM B, to the MEC device. PSM B may indicate a location of User Device B in a similar manner as described above. Additionally, or alternatively, PSM B may indicate a speed of User Device B, a direction of movement of User Device B, a velocity of User Device B, and/or the like. As shown, User Device B may be located on a sidewalk adjacent to a roadway (e.g., within opposite boundaries or edges of the sidewalk).

As shown by reference number 106, User Device C may transmit a third PSM, shown as PSM C, to the MEC device. PSM C may indicate a location of User Device C in a similar manner as described above. Additionally, or alternatively, PSM C may indicate a speed of User Device C, a direction of movement of User Device C, a velocity of User Device C, and/or the like. As shown, User Device C may be located within a building. Alternatively, User Device C may be located within a designated area on a sidewalk, such as a seating area of a restaurant, a seating area adjacent to a building, a café, a bench, a bus stop, and/or the like.

In some implementations, to achieve a high degree of location accuracy (e.g., within approximately 1, 2, or 3 centimeters), the MEC device may use real time kinematics (RTK) to increase the accuracy of GPS signals of a user device. For example, the MEC device may transmit RTK information, such as differential GPS (DGPS) corrections, to a user device or a set of user devices (e.g., in a broadcast message or a multicast message). The DGPS corrections may indicate a difference between locations indicated by a GPS satellite system and known fixed locations. A user device may use the received DGPS corrections to refine (e.g., correct or adjust) a GPS location received from a GPS satellite system, and may indicate the refined location to the MEC device. A user device may indicate the refined location in a PSM or in another message that indicates a refinement to a location indicated in a PSM. Alternatively, the user device may transmit a GPS location received from a GPS satellite system to the MEC device, and the MEC device may use DGPS to refine the GPS location indicated by the user device.

As shown by reference number 108, the MEC device may determine a PSM transmission rate for a user device based on a location of the user device, a speed of the user device, a velocity of the user device, a direction of movement of the user device, and/or the like. A PSM transmission rate for a user device (sometimes referred to as a user device PSM transmission rate) may refer to a rate at which the user device transmits PSMs to the MEC device. For example, the PSM transmission rate may indicate a periodicity with which PSMs are to be transmitted by the user device to the MEC device (e.g., every 10 milliseconds (ms), every 100 ms, every second, and/or the like), a physical distance between consecutive PSM transmissions (e.g., every meter, every 2 meters, every 10 meters, every 50 meters, and/or the like), or an event that triggers PSM transmission (e.g., upon exiting a building, upon detecting a wireless network, and/or the like). By adjusting a PSM transmission rate, the MEC device can reduce network congestion and conserve battery power of a user device (e.g., by decreasing the PSM transmission rate) when the user device is not in a vulnerable location, and can improve safety (e.g., by increasing the PSM transmission rate) when the user device is in a vulnerable location. In some implementations, the MEC device may configure user devices to use a minimum PSM transmission rate, such as 1 PSM per second, and may update the PSM transmission rate over time.

In some implementations, the location, the speed, the velocity, and/or the direction of movement may be indicated in a PSM from a user device, and the MEC device may use the indicated location, speed, velocity, and/or direction of movement to determine the PSM transmission rate for the user device. Alternatively, the PSM may indicate the location of the user device and not the speed, velocity, or direction of movement. In this case, the MEC device may receive multiple PSMs from a user device that indicate corresponding multiple locations, and may determine the speed, velocity, and/or direction of movement of the user device based on the multiple locations and/or a time associated with the multiple PSMs. For example, the MEC device may determine a first location indicated in a first PSM from a user device and a first time associated with the first PSM (e.g., a time indicated in the PSM, a time at which the first PSM was transmitted by the user device, a time at which the first PSM was received by the MEC device, and/or the like), may determine a second location indicated in a second PSM from the user device and a second time associated with the second PSM, and may estimate a speed and/or velocity of the user device based on the first location, the second location, the first time, and the second time. For example, the MEC device may calculate the speed and/or a velocity as a distance (e.g., for speed) or a directional distance (e.g., for velocity) between the first location and the second location divided by the time offset between the first time and the second time. In some implementations, the MEC device may calculate the speed and/or velocity of the user device using more than two PSMs, such as three PSMs, four PSMS, and so on. In some implementations, the MEC device may calculate a direction of movement of the user device using multiple locations indicated in corresponding multiple PSMs (e.g., without using the time).

In some implementations, the MEC device and/or the user device may store a high definition (HD) map for a geographic area (e.g., a coverage area) served by the MEC device. An HD map may include a high resolution representation of a roadway, roadway features (e.g., lane models, lane markers, traffic signs, road furniture, lane geometry, and/or the like), and/or features around or near a roadway, such as sidewalks, bicycle lanes, buildings, and/or the like. An HD map may have a resolution level of a few centimeters. An HD map may designate or label different geographic areas as having different features, such as a roadway, a sidewalk, a bicycle lane, a building, an edge of a sidewalk (e.g., a curb), and/or the like. For example, the HD map may indicate geographic boundaries (e.g., using geographic coordinates) of the features. In this way, a MEC device or a user device can determine whether a location of the user device is within a roadway, within a threshold proximity of a roadway, within a bicycle lane, within a sidewalk, within an edge of a sidewalk, within a building, and/or the like. In some implementations, the HD map may be stored by the MEC device and used to perform operations described herein in connection with making determinations based on a location of a user device. Additionally, or alternatively, the MEC device may transmit the HD map or a portion of the HD map to the user device (e.g., a portion of the HD map that represents locations within a threshold proximity of the user device), and the user device may perform one or more operations described herein locally. In some implementations, the user device may request and/or the MEC device may determine to transmit, to the user device, an additional portion of the HD map based on a location of the user device being within a threshold of a boundary of a portion of the HD map stored by the user device. In some implementations, the request for, and/or the determination to transmit, the additional portion of the HD map may be based on one or more vulnerability parameters, such as a location of the user device, a speed of the user device, a velocity of the user device, and/or the like.

In some implementations, the MEC device may determine a higher PSM transmission rate for a user device that is located in a roadway or is located within a threshold proximity of a roadway (e.g., at an edge of a sidewalk or path adjacent to the roadway), and may determine a lower PSM transmission rate for a user device that is not located in a roadway and is not located within a threshold proximity of a roadway (e.g., that is located in the middle of the sidewalk, along an edge of a sidewalk that is not adjacent to the roadway, in a building, in a designated area on the sidewalk, and/or the like). Additionally, or alternatively, the MEC device may determine a higher PSM transmission rate for a user device that is located closer to a roadway as compared to a user device that is located farther from a roadway. In example implementation 100, the MEC device determines a high PSM transmission rate for User Device A located in the roadway, determines a medium PSM transmission rate for User Device B located in the middle of a sidewalk, and determines a low PSM transmission rate for User Device C located in a building (and located farther from the roadway than User Device B). In this way, the MEC device can control PSM transmission rates to improve safety for more vulnerable user devices (e.g., located in or near a roadway or an intersection) and to reduce network congestion and conserve battery power and other resources of less vulnerable user devices (e.g., located farther from a roadway or inside a building).

Additionally, or alternatively, the MEC device may determine a higher PSM transmission rate for a user device that is moving faster, and may determine a lower PSM transmission rate for a user device that is moving slower. Additionally, or alternatively, the MEC device may determine a higher PSM transmission rate for a user device that is not stationary, and may determine a lower PSM transmission rate for a user device that is stationary. For a user device that is moving slower, a location of the user device changes slowly, and so a location indicated in a PSM may not differ significantly from a prior location indicated in a prior PSM. In this case, the location in the prior PSM may be sufficient to avoid a collision, and the location may need to be updated less frequently. Thus, a lower PSM transmission rate may be used. For a user device that is moving faster, a location of the user device changes quickly, and so a location indicated in a PSM may differ significantly from a prior location indicated in a prior PSM. In this case, the location in the prior PSM may not be sufficient to avoid a collision, and the location may need to be updated more frequently. Thus, a higher PSM transmission rate may be used. In this way, the MEC device can control PSM transmission rates to improve safety for more vulnerable user devices (e.g., those moving quickly) and to reduce network congestion and conserve battery power and other resources of less vulnerable user devices (e.g., those moving slowly).

Additionally, or alternatively, the MEC device may determine a higher PSM transmission rate for a user device that is moving toward a roadway (e.g., as indicated by a velocity of the user device or a direction of movement of the user device), and may determine a lower PSM transmission rate for a user device that is moving away from a roadway. In this way, the MEC device can control PSM transmission rates to improve safety for more vulnerable user devices (e.g., those moving toward a roadway) and to reduce network congestion and conserve battery power and other resources of less vulnerable user devices (e.g., those moving away from a roadway).

In some implementations, the MEC device may use multiple parameters (e.g., vulnerability parameters) to determine a PSM transmission rate, such as a speed and a location. For example, if a user device satisfies a speed threshold (e.g., is faster than a threshold, is faster than a first threshold but slower than a second threshold, and/or the like), then the MEC device may classify a VRU of the user device as a cyclist. Other possible VRU classifications include a pedestrian or a vehicle. If the MEC device classifies a VRU of the user device as a cyclist (e.g., when a speed threshold is satisfied), then a different set of locations of the user device may be designated as high vulnerability as compared to a pedestrian (e.g., when the speed threshold is not satisfied). For example, a user device associated with a cyclist may have a low vulnerability when located in a designated bicycle lane, while a user device associated with a pedestrian may have a high vulnerability when located in a designated bicycle lane.

In some implementations, the MEC device may calculate a vulnerability score for a user device based on one or more vulnerability parameters, and may determine a PSM transmission rate for the user device based on the vulnerability score and/or the one or more vulnerability parameters. A vulnerability parameter for a user device may include a location of a user device, a speed of the user device, a velocity of the user device, a direction of movement of the user device, and/or the like. Additionally, or alternatively, a vulnerability parameter may include a parameter that indicates a feature of a roadway that impacts a likelihood or a consequence of a collision, such as a speed limit for the roadway (where a higher speed limit may be more dangerous than a lower speed limit), a type of roadway (e.g., highway, urban street, suburban street, and/or the like), a number of lanes of the roadway (where more lanes may be more dangerous than fewer lanes), a curvature of the roadway or a section of the roadway located within a threshold distance of the user (where a sharp curve may be more dangerous than a shallow curve, which may be more dangerous than a straightaway), a number of accidents, collisions, or fatalities associated with the roadway or a section of the roadway located within a threshold distance of the user, current vehicle traffic conditions of the roadway (where more vehicle traffic may be more dangerous than less vehicle traffic), current speeds of vehicle traveling on the roadway (where higher speeds may be more dangerous than lower speeds), a width of a sidewalk adjacent to the roadway (where a narrower sidewalk may be more dangerous than a wider sidewalk), and/or the like. Additionally, or alternatively, a vulnerability parameter may include an environmental parameter that impacts a likelihood of a consequence of a collision, such as current weather conditions in a location of the user device (where rain, snow, fog, or mist is more dangerous than sun), an amount of sunlight in the location of the user device (where less sun is more dangerous than more sun), artificial lighting conditions in the location of the user device (where fewer lights, such as streetlights, is more dangerous than more lights), a time of day in the location of the user device (where night time is more dangerous than day time or a time when the sun is in a driver's or VRU's eyes is more dangerous than other times of day), and/or the like. In some implementations, the MEC device may apply different weights to different vulnerability parameters, and may calculate the vulnerability score by combining multiple vulnerability parameters using the weights. The MEC device may determine a higher PSM transmission rate for a higher vulnerability score, and may determine a lower transmission rate for a lower vulnerability score.

In some implementations, the MEC device may use one or more artificial intelligence techniques, such as machine learning, deep learning, and/or the like to calculate a vulnerability score, determine a PSM transmission rate for a user device, and/or determine a relaying action for a user device (e.g., as described in more detail below in connection with FIG. 1B). For example, the MEC device (or a cloud computing environment in communication with the MEC device) may train a model using information that includes an HD map, user device vulnerability parameters, vehicle information (e.g., locations, speeds, or other vulnerability parameters), and/or the like, to determine a PSM transmission rate or a relaying action. As an example, the MEC device may determine that previously observed vulnerability parameters are associated with a particular level of vulnerability (e.g., high vulnerability, low vulnerability, medium vulnerability, and/or the like). In some implementations, the MEC device may use a scoring system (e.g., with relatively high scores and/or relatively low scores) to identify and/or classify a set of vulnerability parameters and a vulnerability level as being associated with one another. In this case, the MEC device may determine that a vulnerability score, a PSM transmission rate, or a relaying action is to be assigned to user devices that are determined to be the same or similar as previously scored user devices (e.g., associated with the same or similar vulnerability parameters).

In some implementations, a different device, such as a server device, may generate and train the model. The different device may send the model for use by the MEC device. The different device may update and send (e.g., on a scheduled basis, on an on-demand basis, on a triggered basis, on a periodic basis, and/or the like) the model to the MEC device. Accordingly, the MEC device may use any number of artificial intelligence techniques, machine learning techniques, deep learning techniques, and/or the like to calculate a vulnerability score, determine a PSM transmission rate, or determine a relaying action. In some implementations, the MEC device may supplement an HD map by marking or designating areas of the HD map as having a determined vulnerability score (or range of vulnerability scores), being associated with a particular PSM transmission rate (or range of PSM transmission rates), being associated with a particular relaying action (or a subset of relaying actions), and/or the like. In this way, processing resources of the MEC device may be conserved for future determinations of a vulnerability score, a PSM transmission rate, or a relaying action.

As shown by reference number 110, the MEC device may transmit, to User Device A, an indication of a first PSM transmission rate to be used by User Device A. The first PSM transmission rate is shown using two examples of 200 ms or 2 meters. When the first PSM transmission rate is 200 ms, User Device A may transmit a PSM (e.g., that indicates a current location of User Device A and/or other current information) to the MEC device every 200 ms. When the first PSM transmission rate is 2 meters, User Device A may transmit a PSM, may determine a location of User Device A when the PSM was transmitted (e.g., which may be indicated in the PSM), may transmit another PSM when a current location of User Device A differs from the location of User Device A when the previous PSM was transmitted by 2 or more meters, and so on. User Device A may transmit subsequent PSMs to the MEC device according to the indicated PSM transmission rate.

As shown by reference number 112, the MEC device may transmit, to User Device B, an indication of a second PSM transmission rate to be used by User Device B. The second PSM transmission rate is shown using two examples of 1 second (sec) or 4 meters. When the second PSM transmission rate is 1 second, User Device B may transmit a PSM (e.g., that indicates a current location of User Device B and/or other current information) to the MEC device every 1 second. When the second PSM transmission rate is 4 meters, User Device B may transmit a PSM, may determine a location of User Device B when the PSM was transmitted (e.g., which may be indicated in the PSM), may transmit another PSM when a current location of User Device B differs from the location of User Device B when the previous PSM was transmitted by 4 or more meters, and so on. User Device B may transmit subsequent PSMs to the MEC device according to the indicated PSM transmission rate.

As shown by reference number 114, the MEC device may transmit, to User Device C, an indication of a third PSM transmission rate to be used by User Device C. The third PSM transmission rate is shown using two examples of 30 seconds or a trigger event of exiting a building or exiting a designated area on a sidewalk. When the third PSM transmission rate is 30 seconds, User Device C may transmit a PSM (e.g., that indicates a current location of User Device C and/or other current information) to the MEC device every 30 seconds. When the third PSM transmission rate indicates the triggering event of exiting the building or exiting the designated area on a sidewalk, User Device C may transmit a PSM upon detecting that User Device C has exited the building or exited the designated area on a sidewalk (e.g., based on a location determined by User Device C, a signal strength parameter measured by User Device C, loss of a wireless local area network (WLAN) connection associated with the building, and/or the like). User Device C may transmit subsequent PSMs to the MEC device according to the indicated PSM transmission rate.

As the MEC device receives additional PSMs from a user device, the MEC device may determine an updated PSM transmission rate for the user device (e.g., based on updated information included in the PSM, an updated vulnerability parameter, and/or the like), and may indicate the updated PSM transmission rate to the user device. In this way, the MEC device may dynamically adjust a PSM transmission rate to improve VRU safety while also conserving user device battery power, conserving network resources, and reducing network congestion.

Figure 1B:
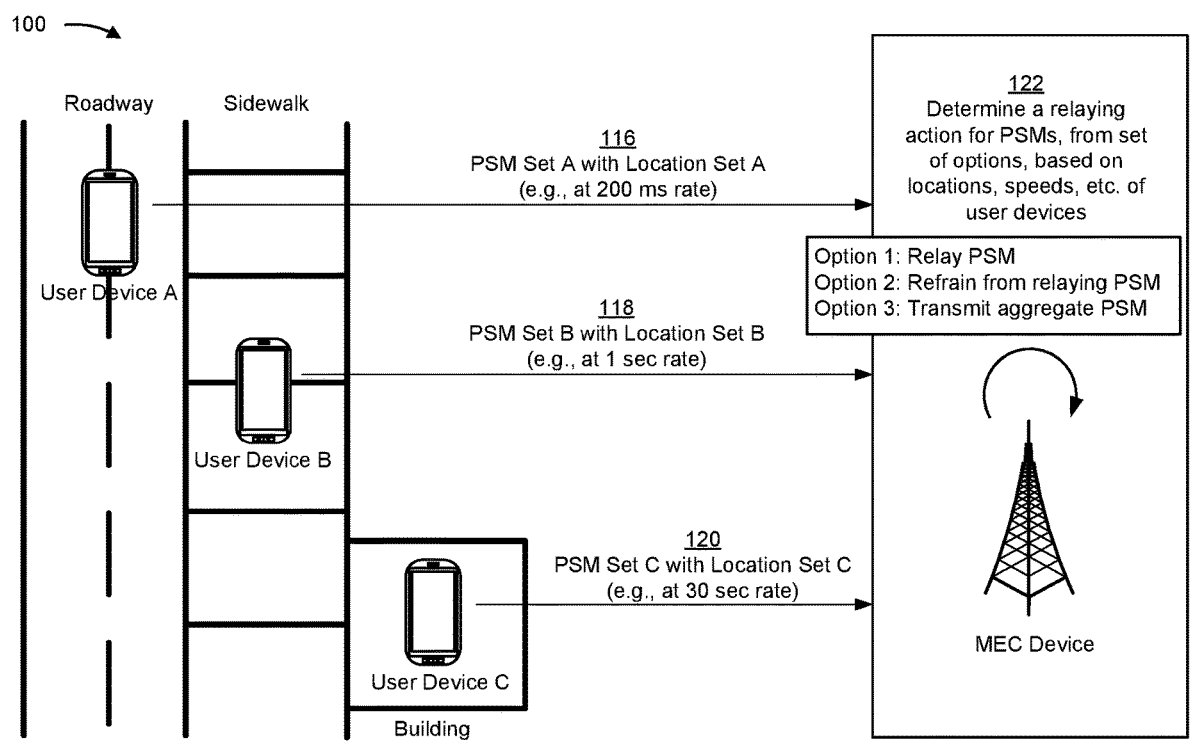

As shown in FIG. 1B, and by reference number 116, User Device A may transmit a first set of PSMs, shown as PSM Set A, to the MEC device. PSM Set A may include multiple PSMs from User Device A transmitted at different times, as described above in connection with FIG. 1A. In some implementations, User Device A may transmit the set of PSMs according to a PSM transmission rate indicated to User Device A by the MEC device, as described above in connection with FIG. 1A. Alternatively, User Device A may transmit PSMs to the MEC device without receiving an indication of a PSM transmission rate that indicates a rate at which the PSMs are to be transmitted. Similarly, as shown by reference number 118, User Device B may transmit a second set of PSMs, shown as PSM Set B, to the MEC device in a similar manner as described with respect to User Device A. As shown by reference number 120, User Device C may transmit a third set of PSMs, shown as PSM Set C, to the MEC device in a similar manner as described with respect to User Device A. In some implementations, RTK may be applied to indicated locations, as described above in connection with FIG. 1A.

As shown by reference number 122, the MEC device may determine a relaying action to be performed by the MEC device with respect to the PSM based on a vulnerability parameter associated with the user device, such as a location of the user device, a speed of the user device, a velocity of the user device, a direction of movement of the user device, and/or the like. In some implementations, the MEC device may select or determine the relaying action from a set of options for the relaying action. The set of options may be stored in memory of the MEC device, and the MEC device may select an option, from the set of options, based on the vulnerability parameter. For example, the relaying action (e.g., an option) may include relaying the PSM to one or more V2X devices in a vicinity of the MEC device, refraining from relaying the PSM to the one or more V2X devices, transmitting an aggregate PSM that is generated based on multiple PSMs received from multiple user devices, and/or the like. The MEC device may perform the determined relaying action.

In some implementations, the MEC device may determine to relay (e.g., transmit) a PSM in the scenarios described above in connection with determining a higher PSM transmission rate, such as when the user device is located in a roadway, located within a threshold proximity of a roadway, located closer to a roadway, not located in a building, moving faster, not stationary, moving toward a roadway, associated with a more dangerous vulnerability parameter, associated with a higher vulnerability score, and/or the like. Additionally, or alternatively, the MEC device may determine to refrain from relaying (e.g., to suppress, or not transmit) a PSM in the scenarios described above in connection with determining a lower PSM transmission rate, such as when the user device is not located in a roadway, not located within a threshold proximity of a roadway, located farther from a roadway, located in a building, moving slower, stationary, moving away from a roadway, associated with a less dangerous vulnerability parameter, associated with a lower vulnerability score, and/or the like. Additional details regarding determining and performing a relaying action based on a vulnerability parameter are described below in connection with FIGS. 1C-1E.

Figure 1C:
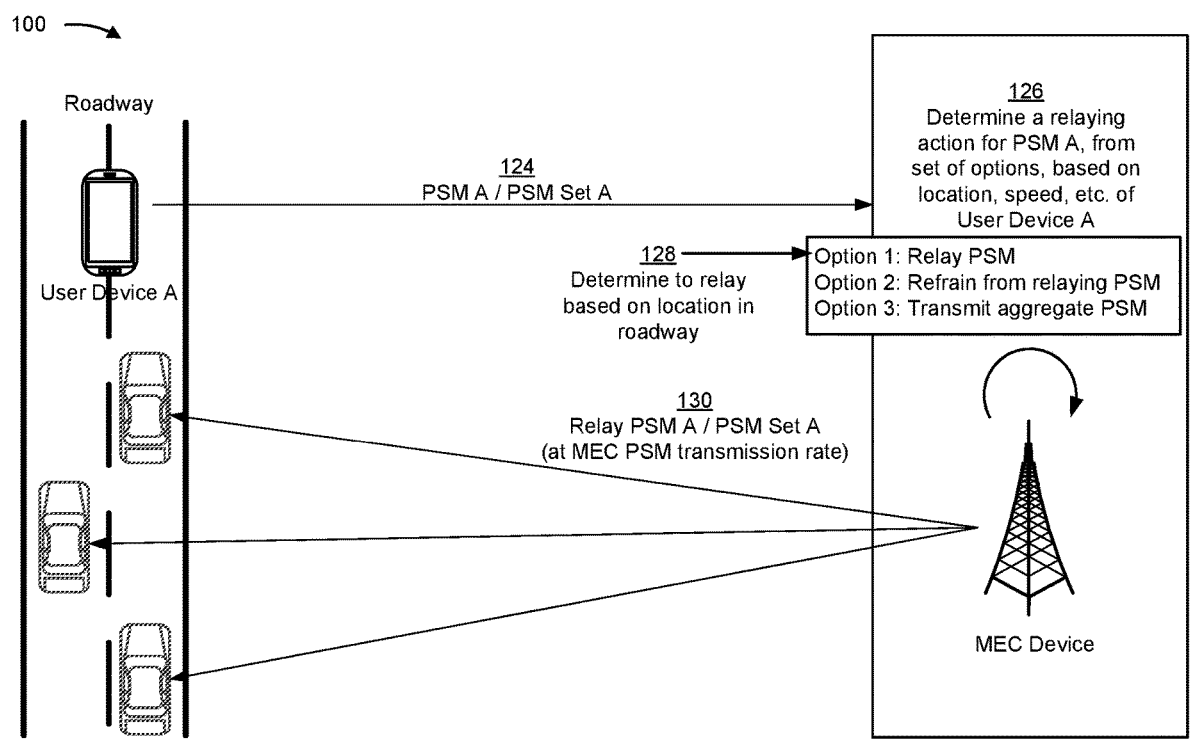

As shown in FIG. 1C, and by reference number 124, User Device A may transmit a PSM (shown as PSM A) or a set of PSMs (shown as PSM Set A) to the MEC device, as described above in connection with FIGS. 1A and 1B. As shown by reference number 126, the MEC device may determine a relaying action to be performed by the MEC device with respect to PSM A (or PSM Set A) based on a vulnerability parameter associated with User Device A (e.g., a location of User Device A, a speed of User Device A, a velocity of User Device A, a direction of movement of User Device A, and/or the like). As shown by reference number 128, the MEC device determines to relay the PSM for User Device A because User Device A is located in a roadway. As a result, User Device A has a high vulnerability level, and thus V2X devices in the vicinity of User Device A should be notified about the presence of User Device A. As shown by reference number 130, the MEC device relays (e.g., transmits) PSM A or PSM Set A to V2X devices within a vicinity of User Device A, such as V2X devices that have established a connection with the MEC device, V2X devices within a threshold proximity of User Device A, and/or the like. In this way, the MEC device may improve safety for a user of User Device A.

In some implementations, the MEC device may determine a MEC PSM transmission rate for transmission (e.g., relaying) of PSMs by the MEC device to the V2X devices. The MEC PSM transmission rate may be based on one or more vulnerability parameters and/or a vulnerability score, in a similar manner as described above in connection with a user device PSM transmission rate. In some implementations, the MEC PSM transmission rate associated with transmitting or relaying PSMs for a user device may be different from (e.g., may have a higher rate or a lower rate than) the user device PSM transmission rate indicated to that user device. For example, if the user device is associated with a high level of vulnerability, the MEC device may transmit a PSM for the user device at a higher PSM transmission rate even if the MEC device is receiving PSMs from the user device at a lower PSM transmission rate.

In some implementations, the MEC device may determine to transmit an alert to User Device A or to a V2X infrastructure device (e.g., a stoplight, a streetlight, a parking meter, a siren, a traffic light, a crosswalk signal, and/or the like) based on one or more vulnerability parameters and/or a vulnerability score. For example, if a user device is located in a roadway, within a threshold proximity of a roadway, or otherwise associated with a high level of vulnerability, then the MEC device may transmit an alert to the user device and/or to a V2X infrastructure device within the vicinity of the user device. The alert may notify the user device and/or the V2X infrastructure device of the high level of vulnerability. In some implementations, the MEC device may send the alert if there are V2X devices (e.g., vehicles) or a threshold number of V2X devices within a threshold proximity of the user device.

Figure 1D:
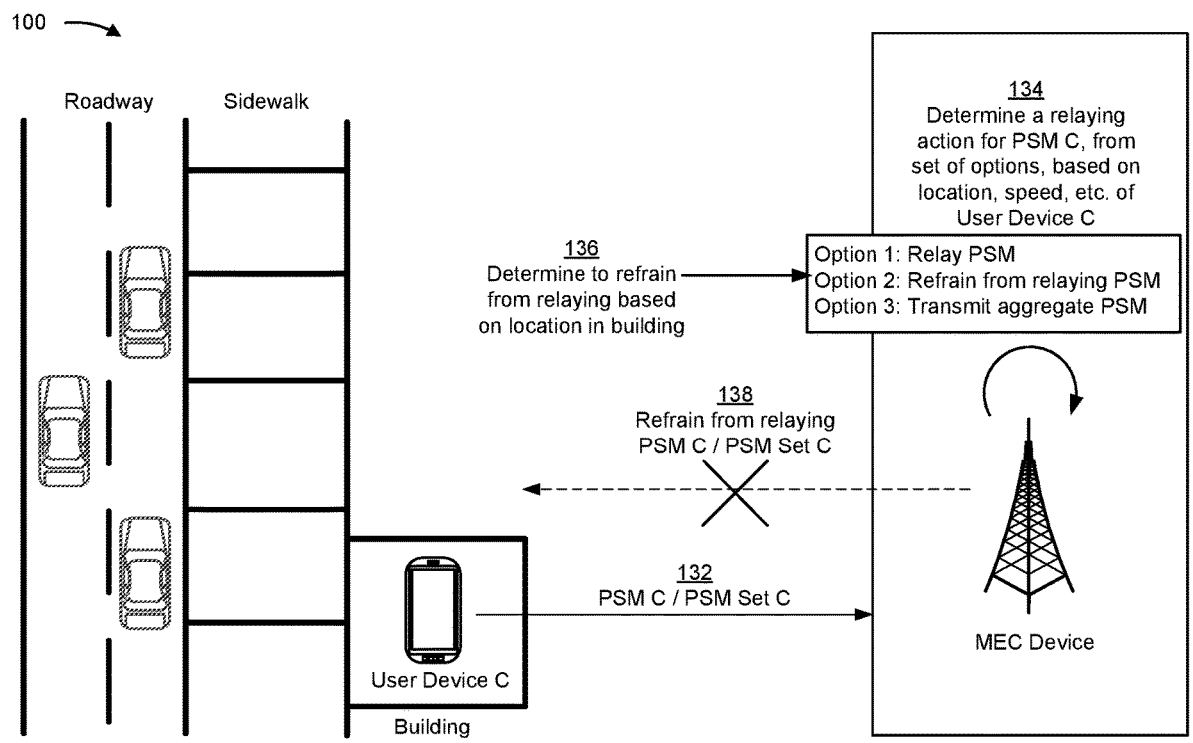

As shown in FIG. 1D, and by reference number 132, User Device C may transmit a PSM (shown as PSM C) or a set of PSMs (shown as PSM Set C) to the MEC device, as described above in connection with FIGS. 1A and 1B. As shown by reference number 134, the MEC device may determine a relaying action to be performed by the MEC device with respect to PSM C (or PSM Set C) based on a vulnerability parameter associated with User Device C (e.g., a location of User Device C, a speed of User Device C, a velocity of User Device C, a direction of movement of User Device C, and/or the like). As shown by reference number 136, the MEC device determines to refrain from relaying (e.g., to suppress, to refrain from transmitting, and/or the like) the PSM for User Device C because User Device C is located in a building or in a designated area on a sidewalk. Since User Device C is located in a building or a designated area on a sidewalk, User Device C has a low vulnerability level, and thus V2X devices in the vicinity of User Device C (if any) need not be notified about the presence of User Device C. As shown by reference number 138, the MEC device refrains from relaying PSM C or PSM Set C. For example, the MEC device may drop PSM C or PSM Set C. As another example, the MEC device may determine to refrain from relaying a PSM for a user device associated with a cyclist located in a bicycle lane. As another example, the MEC device may determine to refrain from relaying a PSM for a user device associated with a speed that is greater than or equal to a threshold speed, such as a threshold speed that is faster than bicycle travel. In this way, the MEC device can discard PSMs associated with user devices that are traveling in an automobile (e.g., where the automobile may transmit separate safety messages, such as a basic safety message (BSM)). In this way, the MEC device may reduce network congestion by refraining from transmitting PSMs for user devices that are not vulnerable.

Figure 1E:
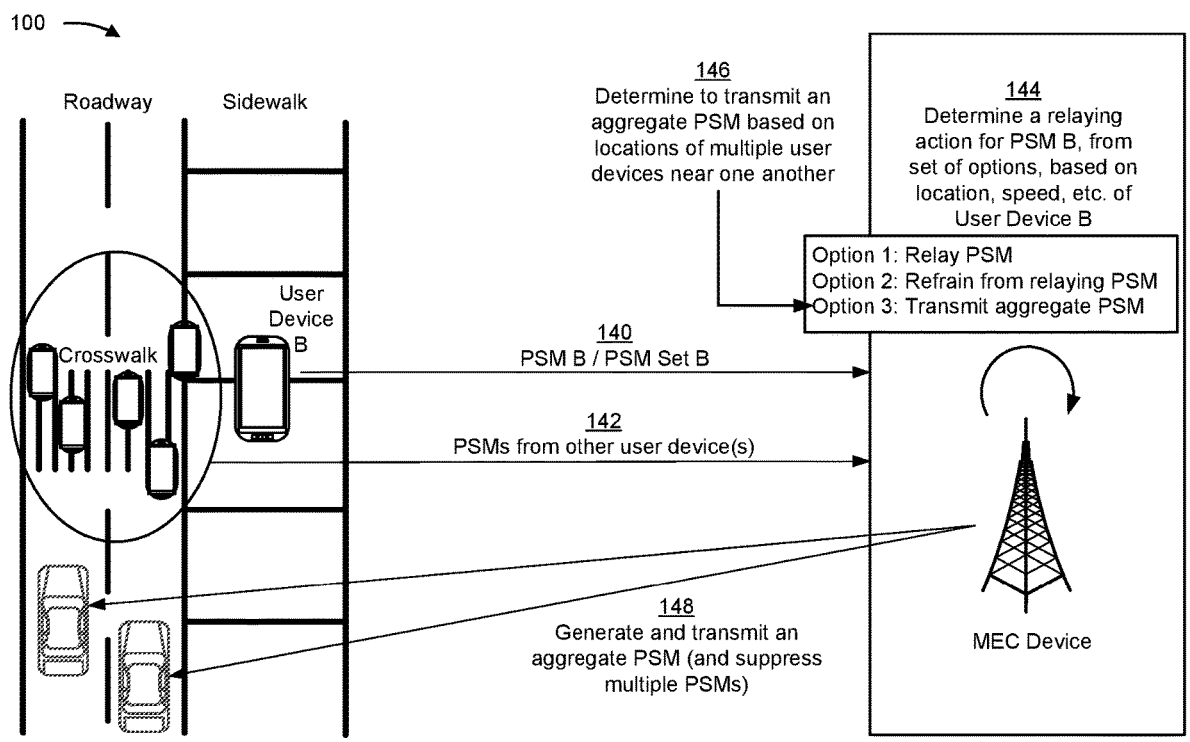

As shown in FIG. 1E, and by reference number 140, User Device B may transmit a PSM (shown as PSM B) or a set of PSMs (shown as PSM Set B) to the MEC device, as described above in connection with FIGS. 1A and 1B. As shown by reference number 142, one or more other user devices may also transmit PSMs or sets of PSMs to the MEC device. User Device B and the set of other user devices may be located within a threshold proximity of one another. Furthermore, User Device B and the set of user devices may be located within a geographic area that is designated (e.g., in an HD map) as having high VRU traffic (e.g., high pedestrian traffic, high cyclist traffic, and/or the like), or the MEC device may designate a geographic area (e.g., of an HD map) as having high VRU traffic based on a threshold number of PSMs indicating user device locations within the geographic area.

As shown by reference number 144, the MEC device may determine a relaying action to be performed by the MEC device with respect to PSM B (or PSM Set B) based on a vulnerability parameter associated with User Device B (e.g., a location of User Device B, a speed of User Device B, a velocity of User Device B, a direction of movement of User Device B, and/or the like). As shown by reference number 146, the MEC device determines to transmit an aggregate PSM associated with User Device B (e.g., PSM B or PSM Set B) because of a threshold number of user devices transmitting PSMs within a designated geographic area. When transmitting an aggregate PSM, the MEC device may transmit a single PSM (e.g., the aggregate PSM) and may refrain from transmitting (e.g., may suppress) individual PSMs for each of the user devices located within the designated geographic area. In this way, the MEC device may reduce network congestion. The aggregate PSM may indicate the designated area (e.g., using one or more coordinates, such as geographic coordinates, GPS coordinates, and/or the like), may indicate a boundary of the designated area (e.g., using multiple coordinates), may indicate one or more locations along the boundary of the designated area, may indicate one or more locations within the boundary of the designated area, and/or the like. As shown by reference number 148, the MEC device generates the aggregate PSM and transmits the aggregate PSM to V2X devices within a vicinity of the designated area, such as V2X devices that have established a connection with the MEC device, V2X devices within a threshold proximity of the designated area, and/or the like. In this way, the MEC device may improve safety for VRUs located within the designated area because V2X devices that receive the aggregate PSM may avoid collisions with VRUs in the designated area.

In some implementations, the MEC device may determine a MEC PSM transmission rate for transmission of PSMs (e.g., aggregate PSMs) by the MEC device to the V2X devices. The MEC PSM transmission rate may be based on one or more vulnerability parameters and/or a vulnerability score, in a similar manner as described above in connection with a user device PSM transmission rate. In some implementations, the MEC PSM transmission rate associated with transmitting aggregate PSMs for a set of user devices may be different from (e.g., may have a higher rate or a lower rate than) the user device PSM transmission rates indicated to those user devices (e.g., which may also be different from one another). For example, if the designated area is associated with a high level of vulnerability, the MEC device may transmit aggregate PSMs for the user devices associated with the designated area at a higher PSM transmission rate even if the MEC device is receiving PSMs from the user devices at a lower PSM transmission rate. In this way, the MEC device can improve safety of VRUs while also reducing network congestion and conserving battery power of user devices.

Although some operations are described herein (e.g., in connection with FIGS. 1A-1E) as being performed by the MEC device, in some implementations, one or more of those operations may be performed by a user device. For example, rather than transmitting one or more vulnerability parameters to the MEC device for the MEC device to determine a PSM transmission rate for the user device and indicate the PSM transmission rate to the user device, the user device may determine the PSM transmission rate based on the one or more vulnerability parameters, and may transmit PSMs to the MEC device at the PSM transmission rate determined by the user device. Additionally, or alternatively, rather than transmitting one or more vulnerability parameters to the MEC device for the MEC device to determine a relaying action to be performed in connection with the user device and to perform the relaying action, the user device may determine a transmission action for a PSM (e.g., transmit the PSM, refrain from transmitting the PSM, aggregate PSMs of multiple user devices, and/or the like) based on the one or more vulnerability parameters, and may perform the transmission action to selectively transmit PSMs to the MEC device and/or to one or more other V2X devices.

As indicated above, FIGS. 1A-1E are provided as examples. Other examples can differ from what is described with regard to FIGS. 1A-1E. The number and arrangement of devices and networks shown in FIGS. 1A-1E are provided as one or more examples. In practice, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
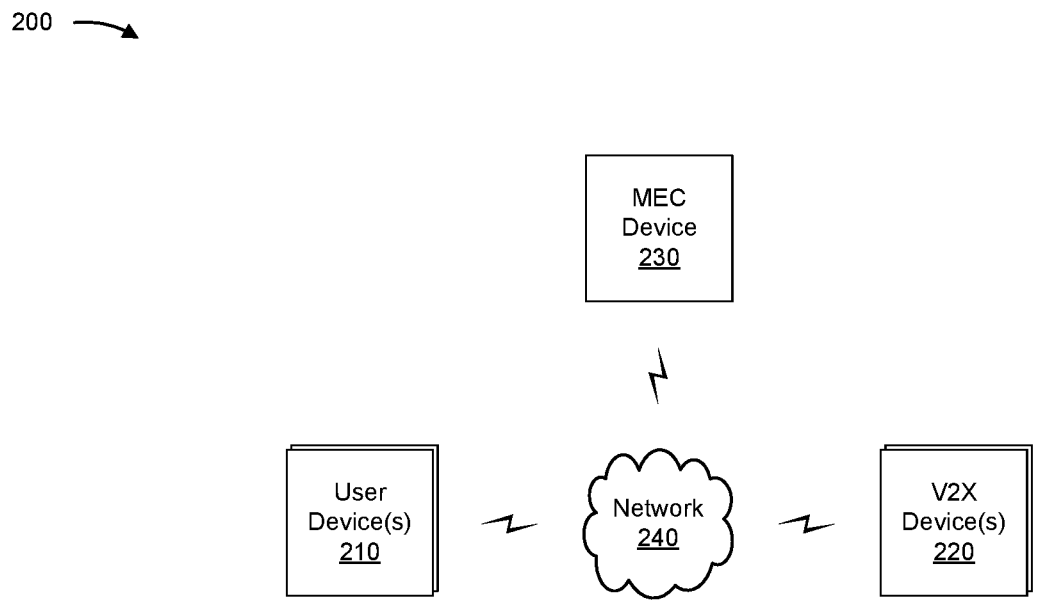
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a set of (e.g., one or more) user devices 210, a set of V2X devices 220, a MEC device 230, and a network 240. Devices of environment 200 may interconnect via wired connections, wireless connections, or a combination of wired and wireless connections.

User device 210 includes one or more devices capable of transmitting PSMs and capable of establishing a network connection with MEC device 230 to receive and/or transmit information associated with PSM transmission. For example, user device 210 may include a communication and/or computing device, such as a mobile phone (e.g., a smart phone, a radiotelephone, and/or the like), a laptop computer, a tablet computer, a handheld computer, one a gaming device, a wearable communication device (e.g., a smart wristwatch, a pair of smart eyeglasses, and/or the like), a user device in a vehicle, a user device in a bicycle, or a similar type of device. In some implementations, user device 210 may be a user equipment as defined by the 3$^{rd}$ Generation Partnership Project (3GPP).

V2X device 220 includes one or more devices capable of communicating in a V2X network, such as a CV2X network, such as via uplink and downlink communication and/or via sidelink communication. For example, V2X device 220 may include a communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), a user device in a vehicle, a user device in a bicycle, or a similar type of device. In some implementations, V2X device 220 may be a user equipment as defined by the 3GPP.

MEC device 230 includes one or more devices capable of communicating with user device 210 and V2X devices 220 using a cellular radio access technology (RAT). For example, MEC device 230 may include a base station, a base transceiver station, a radio base station, a node B, an evolved node B (eNB), a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. MEC device 230 may transfer or relay traffic between user devices 210 and/or V2X devices 220 (e.g., using a cellular RAT), other base stations (e.g., using a wireless interface or a backhaul interface, such as a wired backhaul interface), and/or network 240. MEC device 230 may provide one or more cells that cover geographic areas. Some MEC devices 230 may be mobile base stations. Some MEC devices 230 may be capable of communicating using multiple RATs, such as a 5G or New Radio (NR) RAT, a Long Term Evolution (LTE) RAT, and/or the like.

In some implementations, MEC device 230 may perform scheduling and/or resource management and allocation for user devices 210 and/or V2X devices 220 covered by MEC device 230 (e.g., user devices 210 and/or V2X devices 220 covered by a cell provided by MEC device 230). In some implementations, MEC device 230 may be controlled or coordinated by a network controller, which may perform load balancing, network-level configuration, and/or the like. The network controller may communicate with MEC devices 230 via a wireless or wireline backhaul. In some implementations, MEC device 230 may include a network controller, a self-organizing network (SON) module or component, or a similar module or component. In other words, a MEC device 230 may perform network control, scheduling, and/or network management functions (e.g., for other MEC device 230 and/or for uplink, downlink, and/or sidelink communications of user devices 210 and/or V2X devices 220 covered by the MEC device 230). In some implementations, MEC device 230 may include a central unit and multiple distributed units. The central unit may coordinate access control and communication with regard to the multiple distributed units. The multiple distributed units may provide user devices 210, V2X devices 220, and/or other MEC devices 230 with access to network 240. MEC device 230 may include or may communicate with one or more MEC resources. A MEC resource may include hardware, firmware, or a combination of hardware and software, and may include, for example, a server, a security device, a device implementing a virtual machine, a cloud computing resource, and/or the like.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, and/or the like), a wireless wide area network (WWAN), a public land mobile network (PLMN), a local area network (LAN), a telephone network, a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
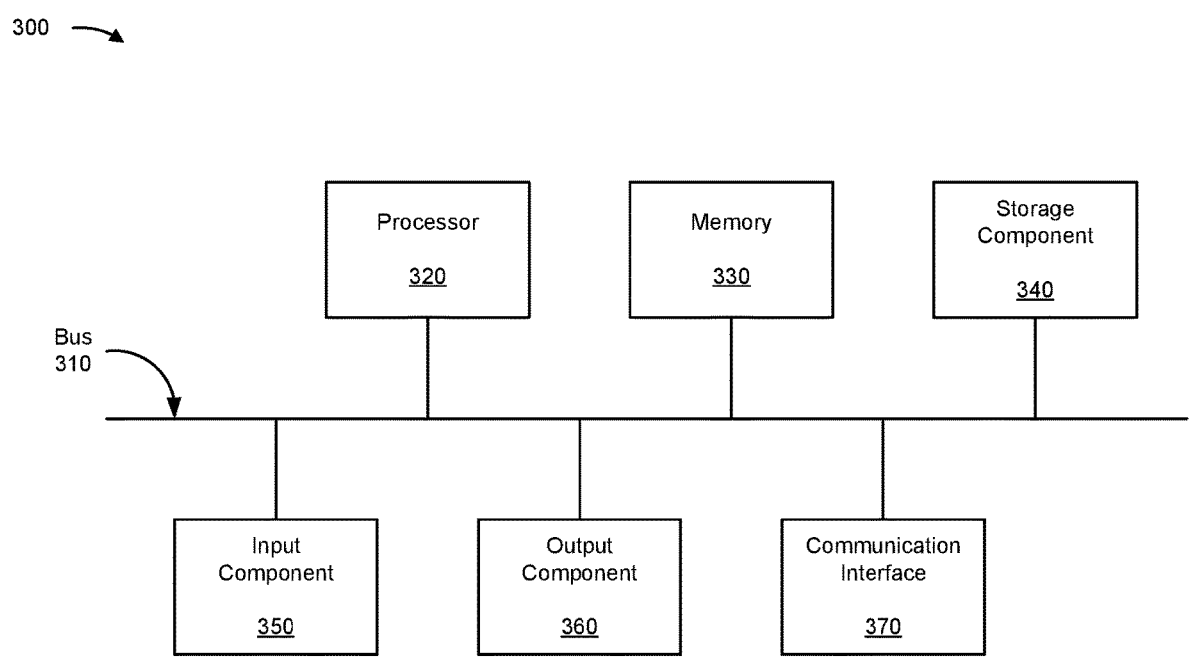
FIG. 3 is a diagram of example components of one or more devices of FIG. 2.

FIG. 3 is a diagram of example components of a device 300. Device 300 may correspond to user device 210, V2X device 220, and/or MEC device 230. In some implementations, user device 210, V2X device 220, and/or MEC device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
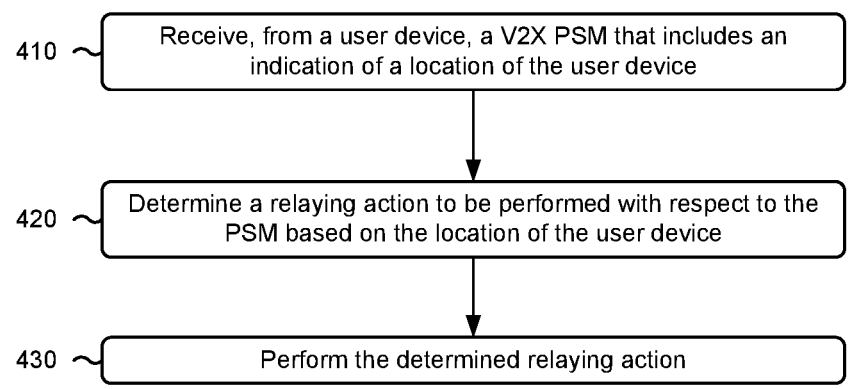
FIG. 4 is a flow chart of an example process for controlling vehicle-to-everything (V2X) personal safety message (PSM) transmission.

FIG. 4 is a flow chart of an example process 400 for controlling vehicle-to-everything personal safety message transmission. In some implementations, one or more process blocks of FIG. 4 may be performed by a MEC device (e.g., MEC device 230). In some implementations, one or more process blocks of FIG. 4 may be performed by another device or a group of devices separate from or including the MEC device, such as a user device (e.g., user device 210), a V2X device (e.g., V2X device 220), and/or the like.

As shown in FIG. 4, process 400 may include receiving, from a user device, a V2X PSM that includes an indication of a location of the user device (block 410). For example, the MEC device (e.g., using processor 320, memory 330, communication interface 370 and/or the like) may receive, from a user device, a V2X PSM that includes an indication of a location of the user device, as described above.

As further shown in FIG. 4, process 400 may include determining a relaying action to be performed with respect to the PSM based on the location of the user device (block 420). For example, the MEC device (e.g., using processor 320, memory 330, storage component 340, input component 350, output component 360, communication interface 370 and/or the like) may determine a relaying action to be performed with respect to the PSM based on the location of the user device, as described above. In some implementations, the relaying action includes at least one of: relaying the PSM to one or more V2X devices in a vicinity of the MEC device, refraining from relaying the PSM to the one or more V2X devices, or transmitting an aggregate PSM that is generated based on multiple PSMs, including the PSM, received from multiple user devices. In some implementations, process 400 includes receiving a plurality of PSMs from the user device, wherein the plurality of PSMs indicate a corresponding plurality of locations associated with the user device; determining a speed or velocity of the user device based on the plurality of locations and a time associated with the plurality of PSMs; and determining the relaying action further based on the speed or the velocity of the user device.

For example, determining the relaying action may include determining to relay the PSM to the one or more V2X devices in the vicinity of the MEC device based on a determination that the location is in a roadway or within a threshold proximity of a roadway, or determining the relaying action may include determining to refrain from relaying the PSM to the one or more V2X devices based on a determination that the location is not in a roadway and is not within a threshold proximity of a roadway. Additionally, or alternatively, determining the relaying action may include: determining to transmit the aggregate PSM based on a determination that the location is within a designated area associated with a threshold number of vulnerable road users. In some implementations, the aggregate PSM includes information that identifies at least one of: the designated area, a boundary of the designated area, or a location along the boundary of the designated area.

Additionally, or alternatively, process 400 may include determining a PSM transmission rate based on the location of the user device, wherein the PSM transmission rate indicates a rate at which the user device is to transmit PSMs to the MEC device; and transmitting, to the user device, an indication of the PSM transmission rate to be used by the user device. In some implementations, determining the relaying action comprises determining to relay the PSM or determining to transmit the aggregate PSM, and the method further comprises: determining a MEC PSM transmission rate based on the location, where the MEC PSM transmission rate indicates a rate at which the MEC is to transmit PSMs from the user device or aggregate PSMs; and performing the determined relaying action comprises: transmitting the PSM or the aggregate PSM using the MEC PSM transmission rate.

As further shown in FIG. 4, process 400 may include performing the determined relaying action (block 430). For example, the MEC device (e.g., using processor 320, memory 330, storage component 340, input component 350, output component 360, communication interface 370 and/or the like) may perform the determined relaying action, as described above. Additionally, or alternatively, process 400 may include transmitting an alert to at least one of the user device or a V2X infrastructure device based on a determination that the location is in a roadway, within a threshold proximity of a roadway, or within a designated area.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
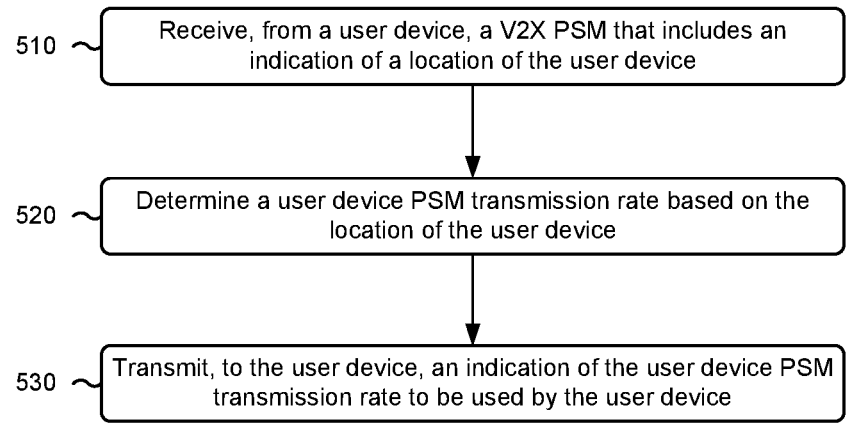
FIG. 5 is a flow chart of another example process for controlling V2X PSM transmission.

FIG. 5 is a flow chart of an example process 500 for controlling vehicle-to-everything personal safety message transmission. In some implementations, one or more process blocks of FIG. 5 may be performed by a MEC device (e.g., MEC device 230). In some implementations, one or more process blocks of FIG. 5 may be performed by another device or a group of devices separate from or including the MEC device, such as a user device (e.g., user device 210), a V2X device (e.g., V2X device 220), and/or the like.

As shown in FIG. 5, process 500 may include receiving, from a user device, a V2X PSM that includes an indication of a location of the user device (block 510). For example, the MEC device (e.g., using processor 320, memory 330, storage component 340, input component 350, output component 360, communication interface 370 and/or the like) may receive, from a user device, a V2X PSM that includes an indication of a location of the user device, as described above.

As further shown in FIG. 5, process 500 may include determining a user device PSM transmission rate based on the location of the user device (block 520). For example, the MEC device (e.g., using processor 320, memory 330, storage component 340, input component 350, output component 360, communication interface 370 and/or the like) may determine a user device PSM transmission rate based on the location of the user device, as described above. In some implementations, the user device PSM transmission rate indicates a rate at which the user device is to transmit PSMs to the MEC device. In some implementations, process 500 includes receiving a plurality of PSMs from the user device, wherein the plurality of PSMs indicate a corresponding plurality of locations associated with the user device; determining a speed or velocity of the user device based on the plurality of locations and a time associated with the plurality of PSMs; and determining the user device PSM transmission rate further based on the speed or the velocity of the user device.

In some implementations, the user device PSM transmission rate is a higher rate based on a determination that the location is in a roadway or within a threshold proximity of a roadway, and the user device PSM transmission rate is a lower rate based on a determination that the location is not in a roadway and is not within a threshold proximity of a roadway.

Additionally, or alternatively, process 500 may include determining a relaying action to be performed by the MEC device with respect to the PSM based on the location of the user device, wherein the relaying action includes at least one of: relaying the PSM to one or more V2X devices in a vicinity of the MEC device, refraining from relaying the PSM to the one or more V2X devices, or transmitting an aggregate PSM that is generated based on multiple PSMs, including the PSM, received from multiple user devices; and performing the determined relaying action.

As further shown in FIG. 5, process 500 may include transmitting, to the user device, an indication of the user device PSM transmission rate to be used by the user device (block 530). For example, the MEC device (e.g., using processor 320, memory 330, storage component 340, input component 350, output component 360, communication interface 370 and/or the like) may transmit, to the user device, an indication of the user device PSM transmission rate to be used by the user device, as described above. In some implementations, the user device PSM transmission rate indicates one of: a periodicity for transmission of PSMs by the user device, or a physical distance for reporting consecutive PSMs.

In some implementations, process 500 includes determining to relay the PSM or determining to transmit the aggregate PSM; and transmitting the PSM or the aggregate PSM using a MEC PSM transmission rate determined based on the location of the user device, wherein the MEC PSM transmission rate is different from the user device PSM transmission rate.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
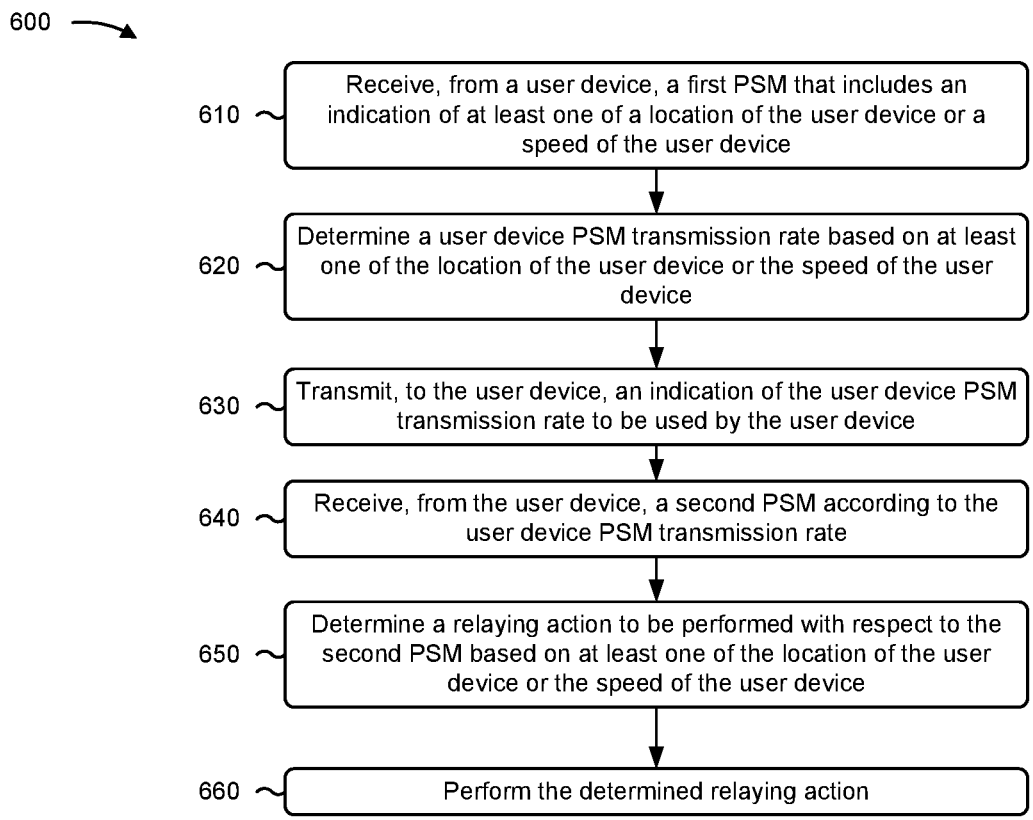
FIG. 6 is a flow chart of another example process for controlling V2X PSM transmission.

FIG. 6 is a flow chart of an example process 600 for controlling vehicle-to-everything personal safety message transmission. In some implementations, one or more process blocks of FIG. 6 may be performed by a MEC device (e.g., MEC device 230). In some implementations, one or more process blocks of FIG. 6 may be performed by another device or a group of devices separate from or including the MEC device, such as a user device (e.g., user device 210), a V2X device (e.g., V2X device 220), and/or the like.

As shown in FIG. 6, process 600 may include receiving, from a user device, a first PSM that includes an indication of at least one of a location of the user device or a speed of the user device (block 610). For example, the MEC device (e.g., using processor 320, memory 330, storage component 340, input component 350, output component 360, communication interface 370 and/or the like) may receive, from a user device, a first PSM that includes an indication of at least one of a location of the user device or a speed of the user device, as described above. In some implementations, process 600 includes transmitting real-time kinematics information to the user device; receiving a refined location of the user device based on transmitting the real-time kinematics information to the user device; and updating the location based on the refined location. In some implementations, the first PSM indicates the location of the user device, and process 600 includes receiving a plurality of PSMs from the user device, wherein the plurality of PSMs indicate a corresponding plurality of locations associated with the user device; and determining the speed of the user device based on the plurality of locations and a time associated with the plurality of PSMs.

As further shown in FIG. 6, process 600 may include determining a user device PSM transmission rate based on at least one of: the location of the user device, or the speed of the user device (block 620). For example, the MEC device (e.g., using processor 320, memory 330, storage component 340, input component 350, output component 360, communication interface 370 and/or the like) may determine a user device PSM transmission rate based on at least one of the location of the user device, or the speed of the user device, as described above. In some implementations, the user device PSM transmission rate indicates a rate at which the user device is to transmit PSMs to the MEC device.

As further shown in FIG. 6, process 600 may include transmitting, to the user device, an indication of the user device PSM transmission rate to be used by the user device (block 630). For example, the MEC device (e.g., using processor 320, memory 330, storage component 340, input component 350, output component 360, communication interface 370 and/or the like) may transmit, to the user device, an indication of the user device PSM transmission rate to be used by the user device, as described above.

As further shown in FIG. 6, process 600 may include receiving, from the user device, a second PSM according to the user device PSM transmission rate (block 640). For example, the MEC device (e.g., using processor 320, memory 330, storage component 340, input component 350, output component 360, communication interface 370 and/or the like) may receive, from the user device, a second PSM according to the user device PSM transmission rate, as described above.

As further shown in FIG. 6, process 600 may include determining a relaying action to be performed with respect to the second PSM, based on at least one of the location of the user device or the speed of the user device (block 650). For example, the MEC device (e.g., using processor 320, memory 330, storage component 340, input component 350, output component 360, communication interface 370 and/or the like) may determine a relaying action to be performed with respect to the second PSM based on at least one of the location of the user device or the speed of the user device, as described above. In some implementations, the relaying action includes at least one of: relaying the second PSM to one or more V2X devices in a vicinity of the MEC device, refraining from relaying the second PSM to the one or more V2X devices, or transmitting an aggregate PSM that is generated based on multiple PSMs, including the second PSM, received from multiple user devices. In some implementations, the aggregate PSM includes information that identifies at least one of: a designated area associated with a threshold number of vulnerable road users, a boundary of the designated area, a location along the boundary of the designated area, or a location within the designated area.

As further shown in FIG. 6, process 600 may include performing the determined relaying action (block 660). For example, the MEC device (e.g., using processor 320, memory 330, storage component 340, input component 350, output component 360, communication interface 370 and/or the like) may perform the determined relaying action, as described above. In some implementations, process 600 includes determining to relay the second PSM or determining to transmit the aggregate PSM; and transmitting the second PSM or the aggregate PSM using a MEC PSM transmission rate determined based on at least one of the location of the user device or the speed of the user device. The MEC PSM transmission rate may be different from the user device PSM transmission rate.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   calculating, by a device, a vulnerability score for a user device based on at least one of:
      a scoring system identifying one or more vulnerability parameters associated with the user device, or
      a first weight, associated with a first vulnerability parameter of the one or more vulnerability parameters, and a second weight associated with a second vulnerability parameter of the one or more vulnerability parameters;
   determining, by the device based on calculating the vulnerability score, a personal safety message (PSM) transmission rate for the user device,
      wherein the PSM transmission rate indicates a rate at which the user device is to transmit one or more PSMs to the device; and
   transmitting, from the device and to the user device, an indication of the PSM transmission rate.

2. The method of claim 1, wherein the one or more vulnerability parameters includes information associated with at least one of a location of the user device, a speed of the user device, a velocity of the user device, or a direction of movement of the user device.

3. The method of claim 2, further comprising:
receiving, from the user device, a PSM of the one or more PSMs including information associated with the at least one of the location of the user device, the speed of the user device, the velocity of the user device, or the direction of movement of the user device.

4. The method of claim 2, further comprising:
receiving, from the user device, a plurality of PSMs that each include information associated with the location of the user device,
determining, based on the information associated with the location of the user device associated with the plurality of PSMs, at least one of the speed of the user device, the velocity of the user device, or the direction of movement of the user device,
wherein the one or more vulnerability parameters includes information associated with at least one of the speed of the user device, the velocity of the user device, or the direction of movement of the user device.

5. The method of claim 1, wherein the one or more vulnerability parameters includes:
information associated with a feature of a roadway that impacts a likelihood or a consequence of a collision, or
information associated with an environmental parameter that impacts the likelihood or the consequence of the collision.

6. The method of claim 1, wherein calculating the vulnerability score is based on the first weight, associated with the first vulnerability parameter, and the second weight associated with the second vulnerability parameter.

7. The method of claim 1, further comprising:
identifying, using a scoring system, the one or more vulnerability parameters,
wherein calculating the vulnerability score is based on identifying the one or more vulnerability parameters.

8. The method of claim 1, wherein the one or more vulnerability parameters comprises the first vulnerability parameter and the second vulnerability parameter.

9. The method of claim 8, further comprising:
classifying, based on information associated with the first vulnerability parameter exceeding a threshold, a user, associated with the user device, as a particular type of user,
wherein determining the PSM transmission rate comprises:
determining, based on calculating the vulnerability score and classifying the user, the PSM transmission rate.

10. The method of claim 1, wherein the PSM transmission rate also indicates at least one of:
a periodicity for transmission of PSMs by the user device, or
a physical distance for reporting consecutive PSMs.

11. A device, comprising:
one or more processors configured to:
determine, based on one or more vulnerability parameters associated with a user device, a relaying action to be performed by the device with respect to a personal safety message (PSM) for the user device;
calculate, based on determining the relaying action, a vulnerability score for the user device based on at least one of:
a scoring system associated with the one or more vulnerability parameters, or
a first weight, associated with a first vulnerability parameter of the one or more vulnerability parameters, and a second weight associated with a second vulnerability parameter of the one or more vulnerability parameters; and
perform, based on calculating the vulnerability score, the relaying action with respect to the PSM for the user device.

12. The device of claim 11, wherein the devices user device is in a vicinity of the device.

13. The device of claim 11, wherein the one or more processors are further configured to:
receive, from a plurality of user devices including the user device, a plurality of PSMs including the PSM,
wherein determining the relaying action is based on receiving the plurality of PSMs.

14. The device of claim 11, wherein the one or more processors are further configured to:
determine, based on the vulnerability score, a PSM transmission rate,
wherein the PSM transmission rate is a rate for the device to transmit the PSM message to the user device, and
wherein the one or more processors, when performing the relaying action, are to:
perform, based on calculating the vulnerability score and using the device PSM transmission rate, the relaying action.

15. The device of claim 11, wherein the one or more processors are further configured to:
determine, based on the vulnerability score, to transmit an alert to the user device.

16. The device of claim 15, wherein the one or more processors are further configured to:
determine, based on the vulnerability score, to transmit an alert to an infrastructure device within a vicinity of the user device.

17. A non-transitory computer-readable medium storing instructions, the instructions comprising:
one or more instructions that, when executed by one or more processors of a device, cause the one or more processors to:
receive a personal safety message (PSM) message from a user device;
determine, based on receiving the PSM message, one or more updated vulnerability parameters associated with the user device;
calculate, based on the one or more updated vulnerability parameters, an updated vulnerability score for the user device;
determine, based on calculating the updated vulnerability score, an updated PSM transmission rate for the user device,
wherein the updated PSM transmission rate indicates a rate at which the user device is to transmit PSMs to the device; and
transmit, to the user device, the updated PSM transmission rate.

18. The non-transitory computer-readable medium of claim 17, wherein the one or more instructions, that cause the one or more processors to receive the PSM message, cause the one or more processors to:

receive, based on transmitting an original PSM transmitting rate, the PSM message from the user device.

19. The non-transitory computer readable medium of claim 17, wherein the one or more instructions, that cause the one or more processors to calculate the updated vulnerability score, cause the one or more processors to:
   calculate, based on the one or more updated vulnerability parameters and using an artificial intelligence technique, the updated vulnerability score for the user device.

20. The non-transitory computer readable medium of claim 17, wherein the one or more instructions, that cause the one or more processors to calculate the updated vulnerability score, cause the one or more processors to:
   determine, based on calculating the updated vulnerability score and using an artificial intelligence technique, the updated PSM transmission rate for the user device.

* * * * *